United States Patent

[11] 3,591,060

| [72] | Inventors | Mikio Nakamura<br>Weston, Ontario;<br>Lawrie G. McIntosh, Etobicoke, Ontario,<br>both of, Canada |
|---|---|---|
| [21] | Appl. No. | 818,603 |
| [22] | Filed | Apr. 23, 1969 |
| [45] | Patented | July 6, 1971 |
| [73] | Assignee | McGraw-Edison of Canada Limited<br>Toronto, Ontario, Canada |
| [32] | Priority | Nov. 29, 1968 |
| [33] | | Canada |
| [31] | | 036,500 |

[54] COMBINED HANDLE AND SPOUT
10 Claims, 4 Drawing Figs.

[52] U.S. Cl. .................................................. 222/475, 220/94
[51] Int. Cl. .................................................. B65d 25/28

[50] Field of Search ........................................ 222/495, 465; 220/94

[56] References Cited
UNITED STATES PATENTS

| 1,621,252 | 3/1927 | Hillyard .................. | 222/465 X |
| 3,096,911 | 7/1963 | Finch et al .............. | 222/465 |
| 3,130,881 | 4/1964 | Jepson ..................... | 222/470 |

FOREIGN PATENTS

| 850,232 | 10/1960 | Great Britain ............ | 222/465 |

Primary Examiner—Raphael H. Schwartz
Attorney—Cushman, Darby and Cushman

ABSTRACT: The invention relates to a combined handle and spout for a liquid containing vessel and where such handle and spout are formed as a unitary member.

PATENTED JUL 6 1971

INVENTORS
MIKIO NAKAMURA
AND
LAWRIE G. McINTOSH
BY: CUSHMAN, DARBY +
CUSHMAN ATTORNEYS

COMBINED HANDLE AND SPOUT

This invention relates to a handle for a liquid containing vessel and is emminently suitable for use where such vessel is used as a kettle.

Many types of kettles, and handles therefor, are known but one of the drawbacks with hitherto known types of handles is that, when a person lifts a kettle of boiling water from a stove, there has been a danger that the knuckle portion of the operator's hand may come into contact with the top of the kettle with serious consequences.

In addition, and with hitherto known types of kettles, the main body of the kettle has been initially formed, then the spout has been formed and united with the body and, finally, the handle has been formed separately and then has been united with the body of the kettle. All of these steps of manufacture and assembly have greatly added to the cost of manufacture.

Hence, the object of the present invention is to overcome the above disadvantages by providing a handle which not only serves as a protection for the knuckles but which also has a spout portion formed integral therewith, said handle being of simple construction, easy to assemble, and relatively inexpensive to manufacture.

According to one broad aspect, the present invention relates to a handle for a substantially closed liquid containing vessel having a combined liquid filling and dispensing aperture, said handle including a pair of substantially radially extending posts projecting from said vessel and connected together, at their upper ends, by a hand-grasping portion and, at their lower ends, by a knuckle-guard portion, said portions and said posts defining an enclosed hand space; and an extension projecting from the lower end of one of said posts and terminating in a substantially radially extending spout in registry with said aperture.

According to another broad aspect, the present invention relates to the combination of a substantially closed liquid containing vessel, having a combined liquid filling and dispensing aperture and handle therefor; said handle including a pair of substantially radially extending posts projecting from said vessel and connected together, at their upper ends, by a hand-grasping portion and, at their lower ends, by a knuckle-guard portion, said portions and said posts defining an enclosed hand space; and an extension projecting from the lower end of one of said posts and terminating in a substantially radially extending spout in registry with said aperture.

The invention is illustrated by way of example in the accompanying drawings in which.

Figure 1:
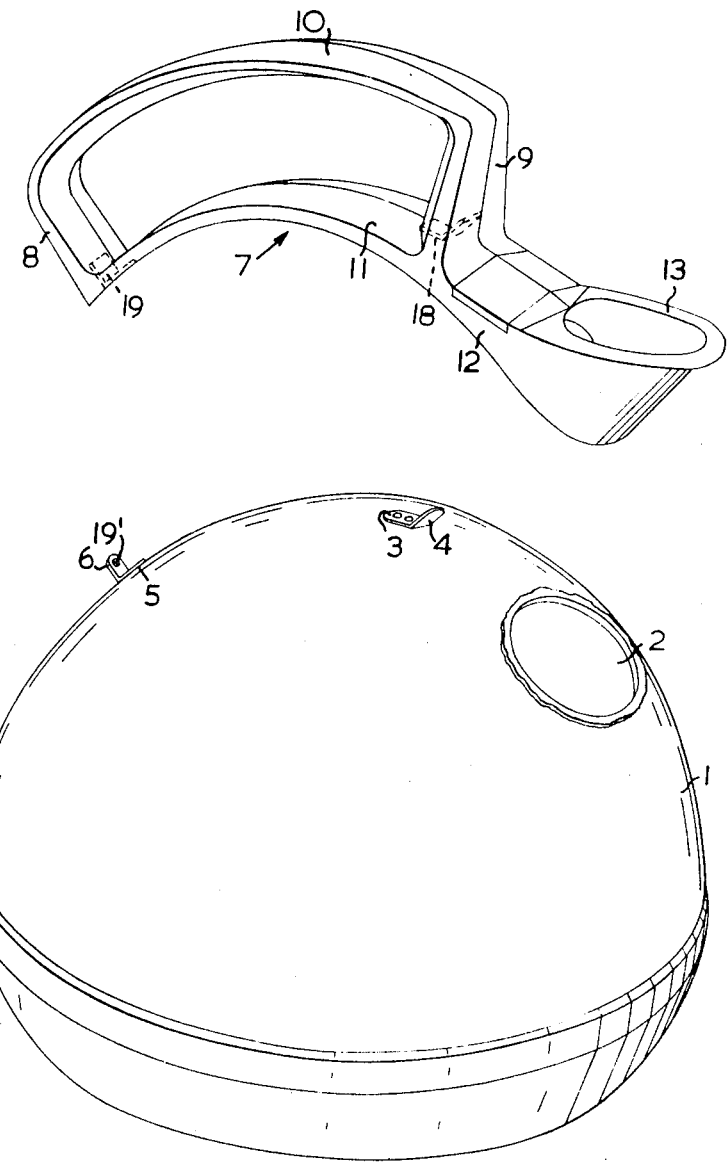
FIG. 1 is an exploded view of the liquid containing vessel and handle.
Figure 2:
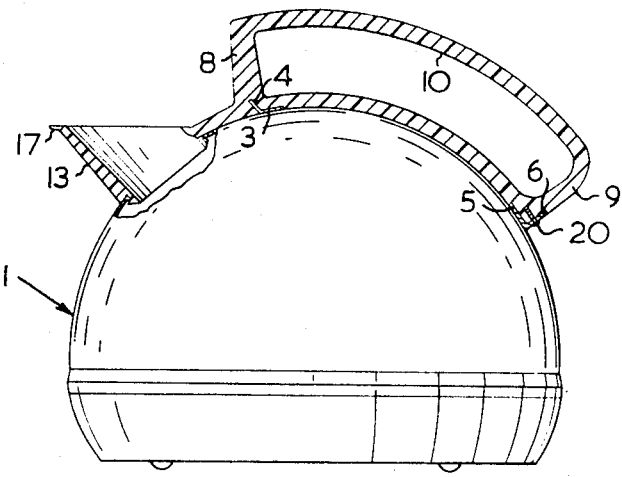
FIG. 2 is a part sectional elevation of the vessel and handle in situ.

Referring to the drawings, and in particular to FIGS. 1 and 2 the liquid containing vessel 1, for the purposes of illustration, is a kettle having a combined liquid filling and dispensing aperture 2, said kettle being of substantially hemispherical configuration and constructed of any suitable material. The top of the kettle is provided with a first tongue secured thereto by means of a base 3 and having an upwardly and acutely angled portion 4. The top of the kettle is also provided with a second tongue secured thereto by means of a base 5 and having an upwardly extending portion 6 arranged at substantially right angles to said base 5.

The handle, indicated generally at 7 in FIGS. 1 and 2 includes a pair of substantially radially extending posts 8, 9 connected, at their upper ends, by a hand-grasping portion 10 and, at their lower ends, by a knuckle-guard portion 11, the area defined by said posts 8, 9 and portions 10, 11 serving as an enclosed space to accommodate the operator's hand when the kettle is carried by means of the handle.

Figure 3:
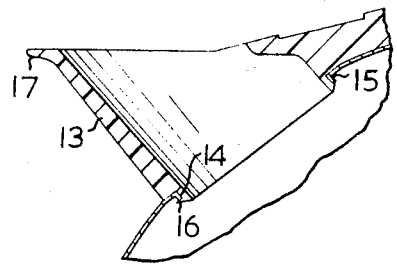
FIG. 3 is a detailed view on an enlarged scale of the spout.

An extension 12, projects from the lower end portion 11 and terminates in a substantially radially extending spout 13 which, when the handle 7 is in situ on the kettle, is in registry with the liquid filling and dispensing aperture 2, as will be more clearly seen in FIGS. 2 and 3.

As will also be seen from FIG. 3 the outer periphery of the lower end of the spout 13 is provided with a circumferential recess 14 which, when the lower end of the spout is pressed into the aperture 2 of the kettle, will accommodate the edge 15 of the aperture 2 as a press-fit, a flange 16 on the spout 13 serving to prevent accidental withdrawal of the spout from the aperture 2. The outer uppermost extremity of the spout 13 is formed with a lip 17 which assists in easy pouring and inhibits drips.

Additional means of detachably connecting the handle 7 to the vessel 1 are constituted by a slot 18 formed in the base of the post 9 and adapted to receive the angled portion 4 of the first tongue. Further means are also provided for detachably connecting the handle 7 to the vessel 1 and are constituted by a right-angled recess 19 formed in the lower end of post 8 and cooperating with the portion 6 of the second tongue which portions as will be seen from FIG. 1 is provided with a hole 11 through which a screw 20 passes into threaded engagement with a corresponding aperture (not shown) in the lower end of post 8.

The hand-grasping portion 10 and the knuckle-guard portion 11 of the handle 7 shown in FIGS. 1 and 2 are arcuate and are formed integral with the posts 8, 9 in the same way as the extension 12 is formed integral with the post 9 and spout 13.

Figure 4:
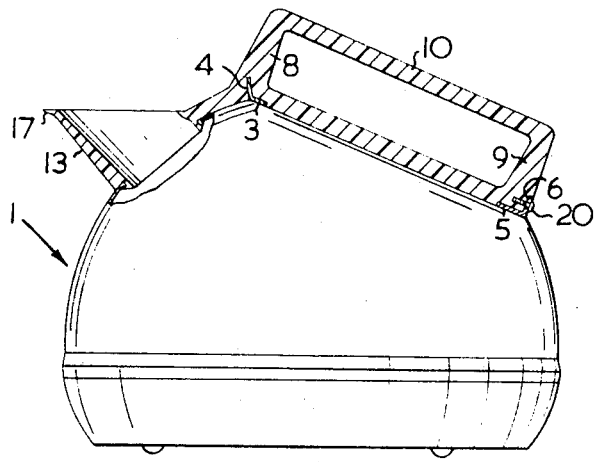
FIG. 4 is an alternative embodiment.

Alternatively, and as is shown in FIG. 4, the hand-grasping portion 10 and knuckle-guard 11 need not be arcuate, but are preferably maintained in spaced relationship by the posts 8, 9 so as to suit the angled top of the type of kettle shown in this Figure.

The embodiments of the invention in which an exclusive property or privilege we claim are defined as follows:

1. A handle for a substantially closed liquid containing vessel having a combined liquid filling and dispensing aperture, said handle including a pair of substantially radially extending posts projecting from said vessel and connected together, at their upper ends, by a hand-grasping portion and, at their lower ends, by a knuckle-guard portion, said portions and said posts defining an enclosed hand space; an extension projecting from the lower end of one of said posts and terminating in a substantially radially extending spout in registry with said aperture; and means for detachably connecting said handle to the vessel, said means including a slot in the base of said one post adapted to accommodate a first tongue secured to and projecting from said vessel; and a second tongue secured to and projecting from said vessel and detachably secured to the lower end of the remaining post.

2. A handle according to claim 1 wherein the outer periphery of said spout, adjacent the lower end thereof, is provided with a circumferential recess to accommodate the edge of said aperture as a press-fit.

3. A handle according to claim 2 wherein each of said hand-grasping and knuckle-guard portions is integral with said posts.

4. A handle according to claim 3 wherein said extension is integral with said spout and said one post, and said spout is provided with a lip.

5. A handle according to claim 4 wherein each of said hand-grasping and knuckle-guard portions is integral with said posts and is arcuate.

6. In combination, a substantially closed liquid containing vessel, having a combined liquid filling and dispensing aperture, and a handle therefor; said handle including a pair of substantially radially extending posts projecting from said vessel and connected together, at their upper ends, by a hand-grasping portion and, at their lower ends, by a knuckle-guard portion, said portions and said posts defining an enclosed hand space; an extension projecting from the lower end of one of said posts and terminating in a substantially radially extending spout in registry with said aperture; and means for detachably connecting said handle to the vessel, said means including a slot in the base of said one post adapted to accommodate a first tongue secured to and projecting from said vessel; and a second tongue secured to and projecting from said vessel and detachably secured to the lower end of the remaining post.

7. The combination according to claim 6 wherein the outer periphery of said spout, adjacent the lower end thereof, is provided with a circumferential recess to accommodate the edge of said aperture as a press-fit.

8. The combination according to claim 7 wherein each of said hand-grasping and knuckle-guard portions is integral with said posts.

9. The combination according to claim 8 wherein said extension is integral with said spout and said one post, and said spout is provided with a lip.

10. The combination according to claim 9 wherein each of said hand-grasping and knuckle-guard portions is integral with said posts and is arcuate.